US008775971B2

(12) United States Patent
Hoover

(10) Patent No.: US 8,775,971 B2
(45) Date of Patent: Jul. 8, 2014

(54) TOUCH DISPLAY SCROLL CONTROL

(75) Inventor: Paul Armistead Hoover, Kirkland, WA (US)

(73) Assignee: Microsoft Corporation, Redmond, WA (US)

( * ) Notice: Subject to any disclaimer, the term of this patent is extended or adjusted under 35 U.S.C. 154(b) by 705 days.

(21) Appl. No.: 12/328,777

(22) Filed: Dec. 5, 2008

(65) Prior Publication Data
US 2010/0146387 A1 Jun. 10, 2010

(51) Int. Cl.
*G06F 3/048* (2013.01)

(52) U.S. Cl.
USPC ............ 715/830; 715/784; 715/863; 345/684

(58) Field of Classification Search
CPC .... G06F 3/0482; G06F 3/0485; G06F 3/0488
USPC ............................. 715/784, 830, 863; 345/684
See application file for complete search history.

(56) References Cited

U.S. PATENT DOCUMENTS

| 6,061,177 | A  | * | 5/2000  | Fujimoto ...................... 359/443 |
| 6,545,669 | B1 |   | 4/2003  | Kinawi et al. |
| 6,690,387 | B2 | * | 2/2004  | Zimmerman et al. ........ 345/684 |
| 7,180,501 | B2 |   | 2/2007  | Marvit et al. |
| 2002/0015064 | A1 |   | 2/2002 | Robotham et al. |
| 2005/0206658 | A1 | * | 9/2005 | Fagans ......................... 345/660 |
| 2006/0055662 | A1 |   | 3/2006 | Rimas-Ribikauskas et al. |
| 2007/0061717 | A1 | * | 3/2007 | Cragun et al. ................. 715/530 |
| 2007/0229466 | A1 |   | 10/2007 | Peng et al. |
| 2008/0034293 | A1 | * | 2/2008 | Vaananen ..................... 715/700 |
| 2008/0040687 | A1 | * | 2/2008 | Randall ......................... 715/830 |
| 2008/0174570 | A1 |   | 7/2008 | Jobs et al. |
| 2008/0195972 | A1 | * | 8/2008 | Lacey et al. ................... 715/817 |
| 2008/0250352 | A1 |   | 10/2008 | Zaliva |
| 2009/0106687 | A1 | * | 4/2009 | De Souza Sana et al. .... 715/784 |
| 2011/0010658 | A1 | * | 1/2011 | Nash et al. .................... 715/784 |

FOREIGN PATENT DOCUMENTS

WO        2008055514 A1        5/2008

OTHER PUBLICATIONS

Olwal, et al., "Rubbing and Tapping for Precise and Rapid Selection on Touch-Screen Displays", Retrieved at <<http://www.csc.kth.se/~alx/projects/research/rubbing/olwal_rubbing_tapping_chi_2008.pdf>>, Proceedings of CHI 2008, Florence, Italy, Apr. 5-10, 2008 , pp. 295-304.
Zaliva, Vadim, "AccelKey Selection Method for Mobile Devices", Retrieved at <<http://arxiv.org/PS_cache/arxiv/pdf/0712/0712.3433v1.pdf>>, Feb. 5, 2008 , pp. 1-16.
Poupyrev, et al., "Ambient Touch: Designing Tactile Interfaces for Handheld Devices", Retrieved at <<http://www.sonycsl.co.jp/person/poup/e-library/2002/uist2002_ambientouch.pdf>>, pp. 10.

* cited by examiner

*Primary Examiner* — Kieu Vu
*Assistant Examiner* — Aaron Lowenberger
(74) *Attorney, Agent, or Firm* — Jeremy Snodgrass; Glen Johnson; Micky Minhas

(57) ABSTRACT

A scroll control recognizes a touch input directed to a selectable item while the selectable item is scrolling on a touch display. The scroll control determines if the selectable item is scrolling above a threshold velocity when the touch input directed to the selectable item is recognized. If the selectable item is determined to be scrolling above the threshold velocity, scrolling of the selectable item is stopped. If the selectable item is determined to be scrolling below the threshold velocity, the selectable item is selected.

20 Claims, 5 Drawing Sheets

TOUCH DISPLAY SCROLL CONTROL

BACKGROUND

A touch display is a display that serves the dual function of visually presenting information and receiving user input. Touch displays may be utilized with a variety of different devices to provide a user with an intuitive input mechanism that can be directly linked to information visually presented by the touch display. A user may use touch input to push soft buttons, turn soft dials, size objects, orientate objects, or perform a variety of different inputs.

SUMMARY

A scroll control recognizes a touch input directed to a selectable item while the selectable item is scrolling on a touch display. The scroll control determines if the selectable item is scrolling above a threshold velocity when the touch input directed to the selectable item is recognized. If the selectable item is determined to be scrolling above the threshold velocity, scrolling of the selectable item is stopped. If the selectable item is determined to be scrolling below the threshold velocity, the selectable item is selected.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

DETAILED DESCRIPTION

Figure 1:
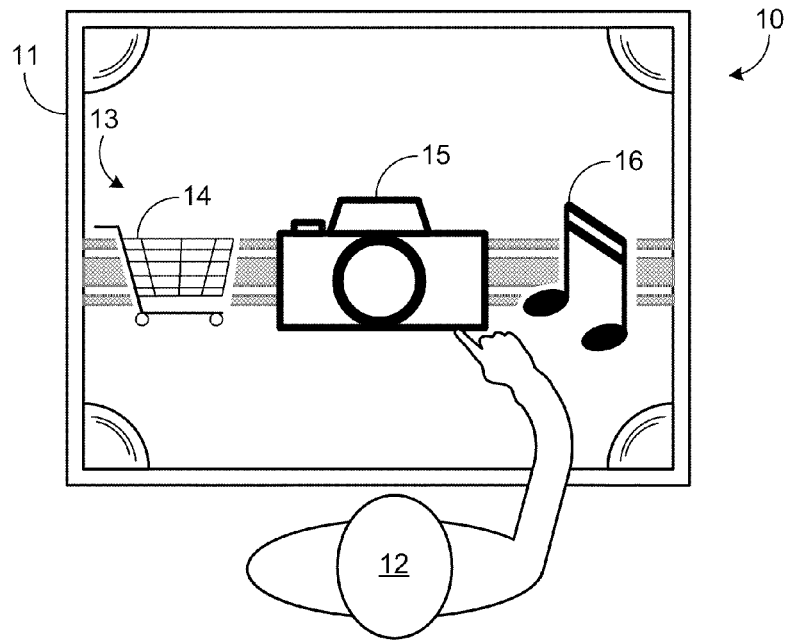
FIG. 1 shows a nonlimiting computing device configured to implement a scroll control in accordance with the present disclosure.

FIG. 1 somewhat schematically shows a computing device 10. Computing device 10 includes a touch display 11 that is configured to visually present images to a user 12 and to receive and process touch input from the user. In the illustrated embodiment, computing device 10 takes the form of a surface computing device. However, it is to be understood that the present disclosure is not limited to surface computing devices. The herein disclosed methods and processes may be implemented on virtually any computing system having a touch display.

Computing device 10 is shown visually presenting an application-launching user interface 13 that includes a plurality of icons that correspond to different applications that the computing device is configured to run. Application-launching user interface 13 is shown displaying a shopping cart icon 14, a camera icon 15, and a musical note icon 16. Such icons may respectively correspond to a shopping application, a photo-organizing application, and a music-organizing application. The icons are selectable items which may be selected by touch input from the user. Furthermore, the icons may be scrolled across touch display 11, so that other icons may be brought into view. For example, the icons may be scrolled across touch display 11 with a scrolling inertia in response to a swiping touch input.

While described here in the context of an application-launching user interface visually presenting icons, it is to be understood that a touch display may visually present one or more other types of selectable items. The present disclosure is compatible with all such selectable items. Nonlimiting examples of such selectable items include words in a list, points on a map, and photos in an array, among others.

Figure 2:
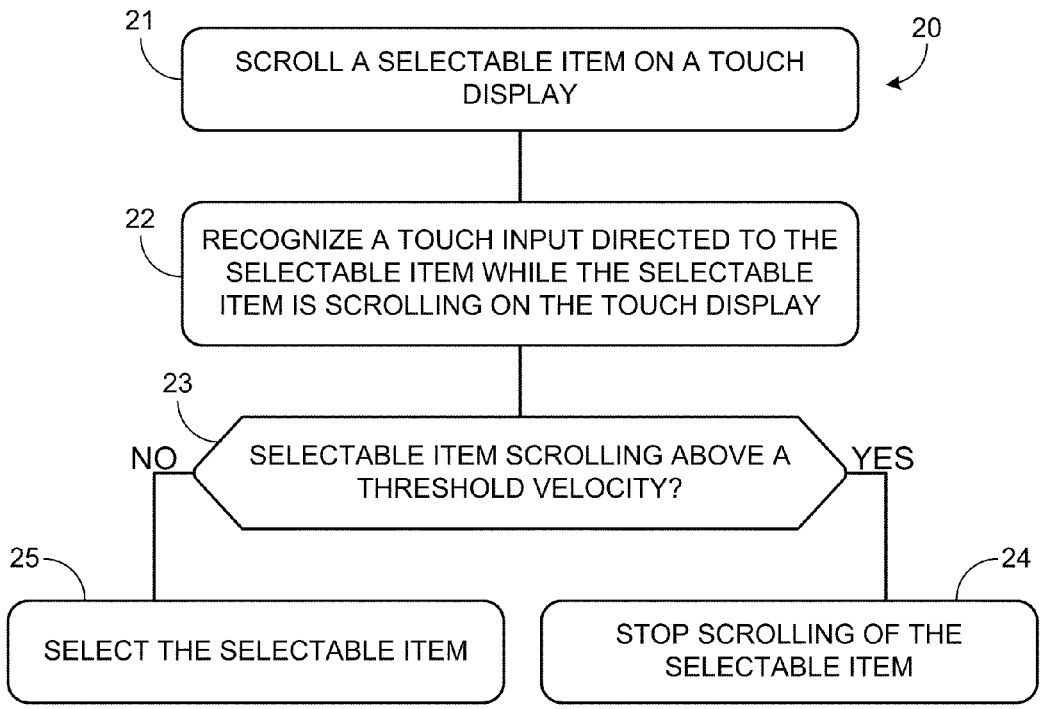
FIG. 2 shows a method of interpreting user input in accordance with an embodiment of the present disclosure.

Turning to FIG. 2, an example method 20 of interpreting user input on a touch display is shown. At 21, method 20 includes scrolling a selectable item on a touch display. The selectable item may be scrolled horizontally across the touch display, vertically across the touch display, or in any other direction without departing from the scope of this disclosure. A single selectable item may be scrolled on the touch display, or a list, array, matrix, or random assortment of selectable items may be scrolled on the touch display. The selectable item may be scrolled responsive to a variety of different inputs, including, but not limited to, a swiping touch input, as indicated by arrow 36 of FIG. 4 and arrow 46 of FIG. 5.

At 22, method 20 includes recognizing a touch input directed to the selectable item while the selectable item is scrolling on the touch display. The touch input may be recognized in a variety of different ways depending on the type of touch display on which the selectable item is being displayed. As an example, the selectable item may be presented on a capacitive touch screen, in which case recognizing the touch input directed to the selectable item may include recognizing a change in capacitance at or near a portion of the screen displaying the selectable item. As another example, the selectable item may be presented on a surface computing device that uses infrared light to track user input, in which case recognizing the touch input directed to the selectable item may include recognizing a change in an amount of infrared light reflecting from a portion of the surface displaying the selectable item. Other touch computing systems may recognize touch input in a different manner without departing from the scope of this disclosure.

At 23, method 20 includes determining if the selectable item is scrolling above a threshold velocity when the touch input directed to the selectable item is recognized. The threshold velocity may be selected based on a plurality of different considerations. As an example, user interaction with a touch display may be examined, and it can be found at what scrolling speed a user feels comfortable selecting a scrolling item on a particular device. It is thought that if an item is scrolling too quickly, a user may not wish to select the scrolling item, but instead stop its scrolling. On the other hand, if a selectable item is scrolling with a relatively slow velocity, a user may expect the selectable item to be selected instead of merely stopping scrolling of the item.

The threshold velocity may be selected to be a certain number of pixels per second (e.g., 1, 2, 5, 10, or another number of pixels per second). The number of pixels per second may be modified depending on the size of the display, the size of the selectable item, the context in which the selectable item is presented, or other suitable factors.

The threshold velocity may be selected to correspond to the selectable item moving a distance equal to a proportional dimension of the selectable item in a direction of scrolling. For example, if a selectable item is scrolling horizontally, and the selectable item is 100 pixels wide in the horizontal dimension, the threshold velocity may be set at some percentage of 100 pixels per second. As specific nonlimiting examples, the threshold velocity may be set to equal the horizontal dimension (e.g., 100 pixels per second), to be twice as large as the horizontal dimension (e.g., 200 pixels per second), to be one half as large as the horizontal dimension (e.g., 50 pixels per second), to be one quarter as large as the horizontal dimension (e.g., 25 pixels per second), or to be any other ratio that yields a threshold velocity below which a user expects a scrolling selectable item to be selected as opposed to merely stopping responsive to user input directed to the selectable item.

Figure 3:
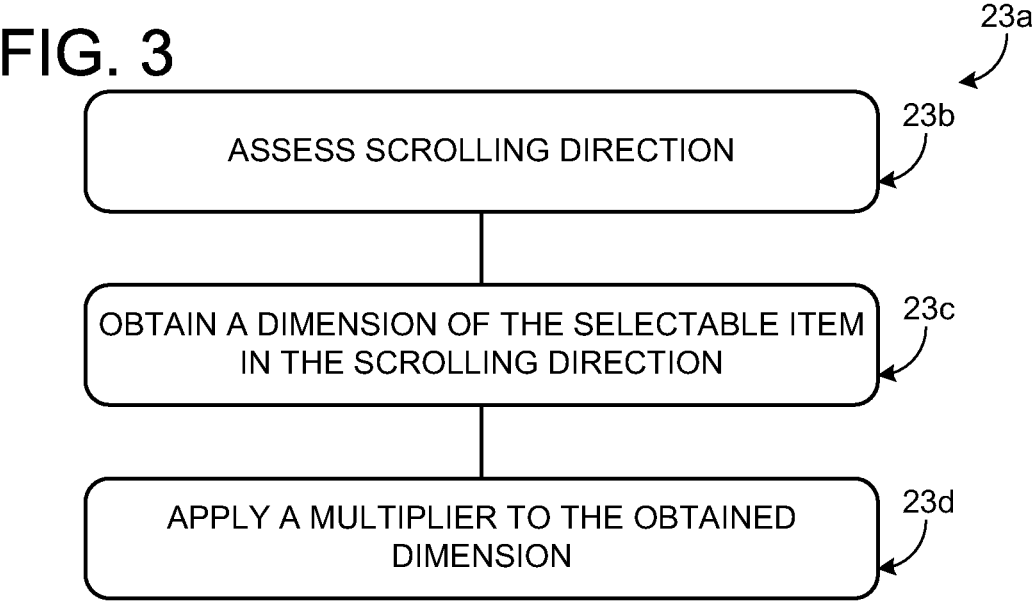
FIG. 3 shows a method of determining if a selectable item is scrolling above a threshold velocity.

FIG. 3 shows an example method 23a of determining if a selectable item is scrolling above a threshold velocity. At 23b, method 23a includes assessing a scrolling direction. For example, it may be assessed that a selectable item is scrolling in a horizontal direction. At 23c, method 23a includes obtaining a dimension of the selectable item in the scrolling direction. For example, it may be determined that the selectable item is 100 pixels wide in the horizontal dimension. At 23d, method 23a includes applying a multiplier to the obtained dimension. For example, a ×1, ×2, ×½, or ×¼ multiplier may be applied to yield 100, 200, 50, or 25 pixels respectively. This may represent how far the selectable item may scroll in a given time (e.g., 1 second). It should be understood that while discussed with reference to a full second, the scrolling measurement may be scaled to another time frame.

In other embodiments, other metrics may be used in determining the threshold velocity, such as the total target area of the selectable item, the spacing between adjacent selectable items, and a user's level of proficiency with the user interface, among others.

Figure 4:
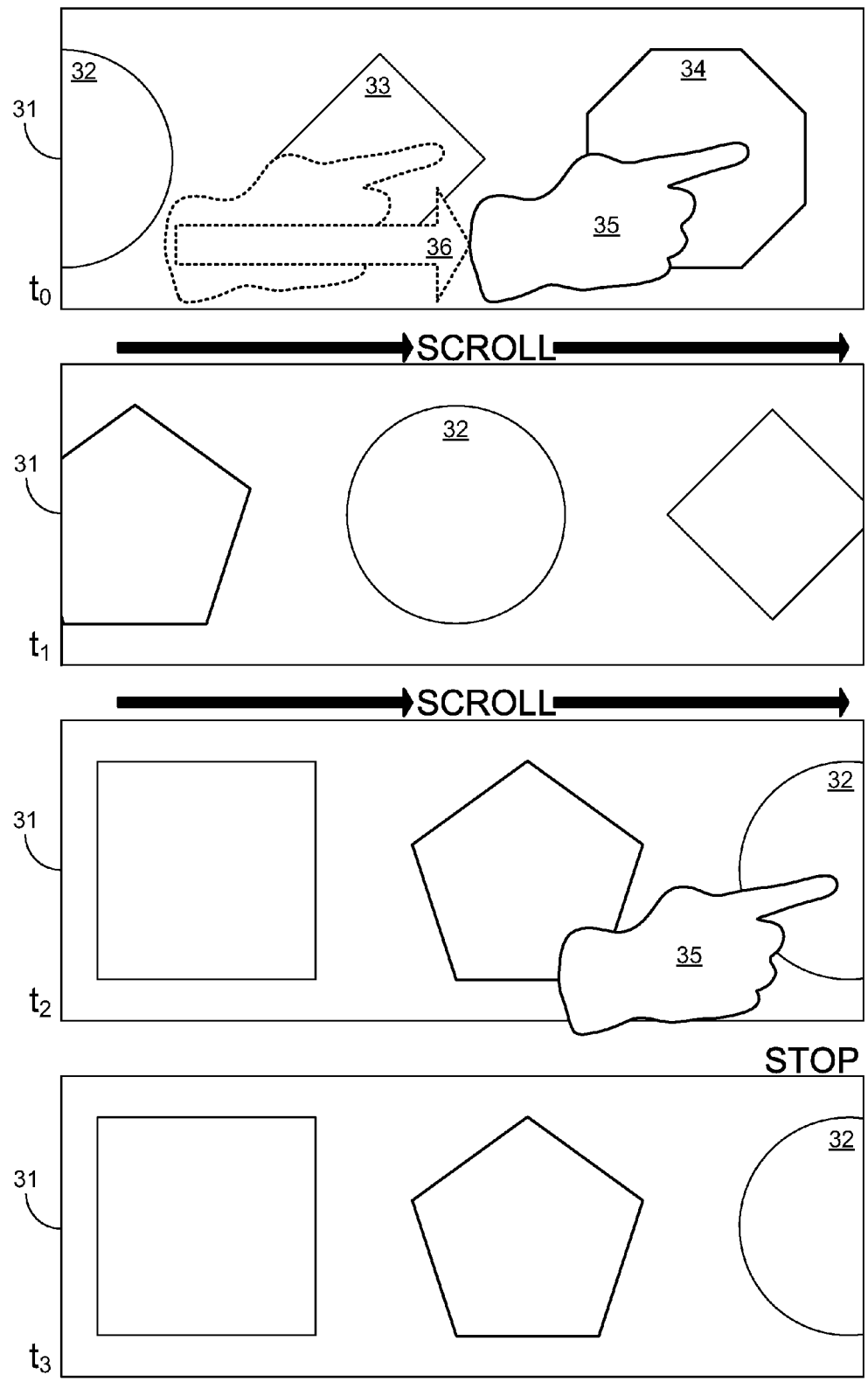
FIG. 4 shows an example usage scenario in accordance with the present disclosure.

As shown at 24, method 20 includes stopping scrolling of the selectable item if the selectable item is determined to be scrolling above the threshold velocity. FIG. 4 shows an example of this behavior. At time $t_0$, a touch display 31 is displaying a selectable item 32, a selectable item 33, and a selectable item 34. A user 35 executes a swiping touch input to scroll the selectable items with a scrolling inertia, as indicated by arrow 36. At times $t_1$ and $t_2$, the selectable items horizontally scroll across touch display 31. Further, at time $t_2$, user 35 directs a touch input to selectable item 32. It is determined that the selectable items are scrolling above a threshold velocity, so at time $t_3$ the selectable items stop scrolling and no selectable items are automatically selected. If the user wishes to then select one of the selectable items, the user may direct a subsequent touch input at the desired selectable item, which is now stopped and thus scrolling below the threshold velocity. Stopping scrolling, as opposed to automatically selecting the item to which touch input is directed, is thought to reduce the likelihood that an undesired selectable item will be accidentally selected because the objects are moving too fast for the user to properly aim.

Figure 5:
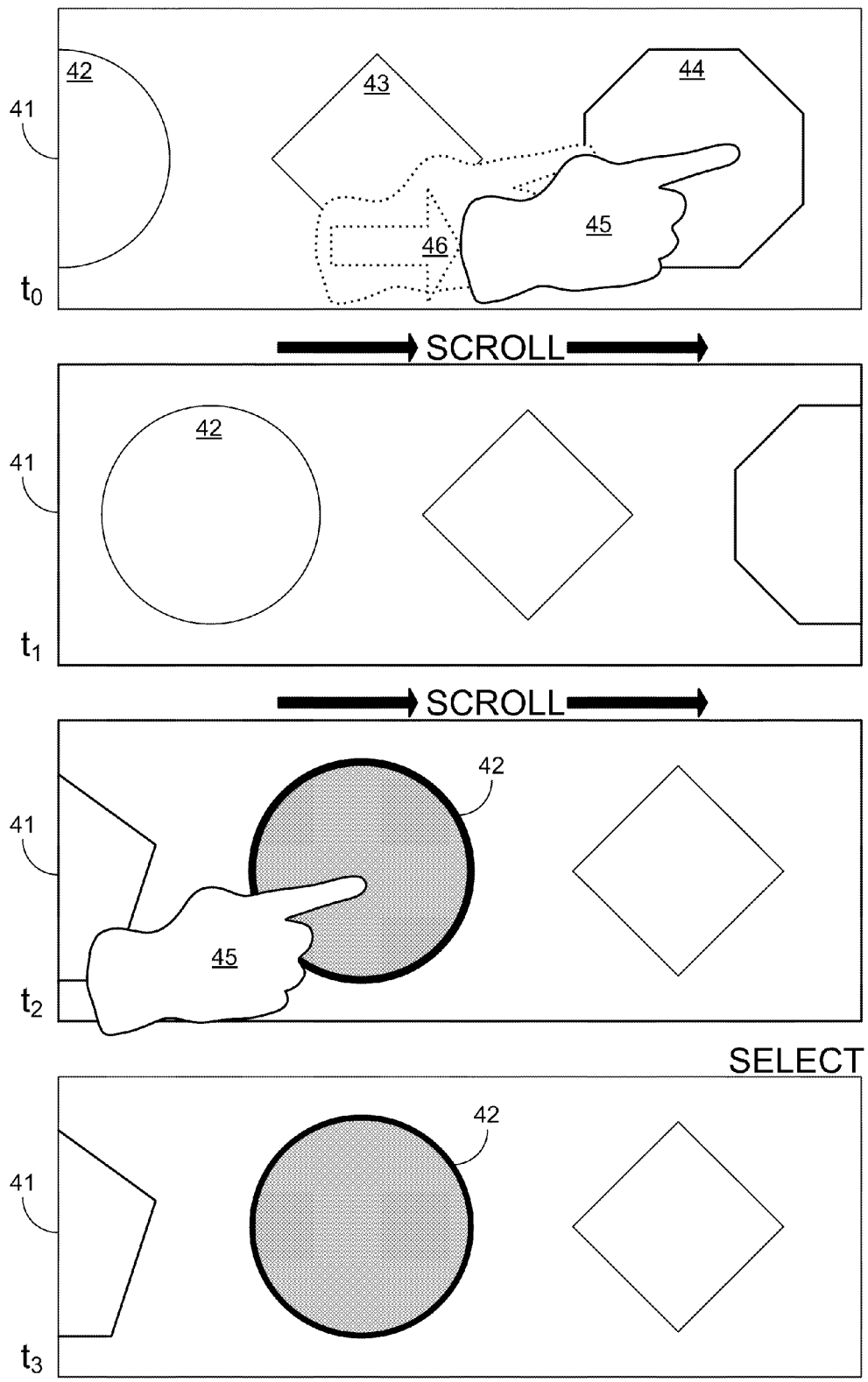
FIG. 5 shows another example usage scenario in accordance with the present disclosure.

Turning back to FIG. 2, at 25, method 20 includes selecting the selectable item if the selectable item is determined to be scrolling below the threshold velocity. FIG. 5 shows an example of this behavior. At time $t_0$, a touch display 41 is displaying a selectable item 42, a selectable item 43, and a selectable item 44. A user 45 executes a swiping touch input to scroll the selectable items with a scrolling inertia, as indicated by arrow 46. In this example, the swiping touch input is relatively slow, and thus the selectable items scroll at a lower velocity. For example, at times $t_1$ and $t_2$ of FIG. 5, the selectable items horizontally scroll across a shorter distance of touch display 41 than the selectable items scrolled across touch display 31 at times $t_1$ and $t_2$ of FIG. 4. Further, at time $t_2$ of FIG. 5, user 45 directs a touch input to selectable item 42. It is determined that the selectable items are scrolling below a threshold velocity, so at time $t_3$ selectable item 42 is automatically selected. No subsequent user inputs are needed to select the selectable item.

When a selectable item is selected, an alternative view of the selectable item may be displayed. This is somewhat schematically shown at times $t_2$ and $t_3$ of FIG. 5, in which selectable item 42 is shaded. An alternative view may include a launched graphical user interface of the selectable item, a modified icon, a larger or smaller version of the selectable item, an animated version of the selectable item, or virtually any other version of the selectable item that is visually distinct from its prior version before selection.

Figure 6:
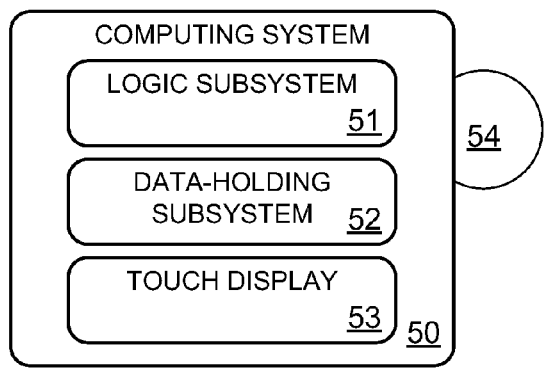
FIG. 6 shows a nonlimiting computing device configured to implement a scroll control in accordance with the present disclosure.

In some embodiments, the above described methods and processes may be tied to a computing system. As an example, FIG. 6 schematically shows a computing system 50 that may perform one or more of the above described methods and processes. Computing system 50 includes a logic subsystem 51, a data-holding subsystem 52, a touch display 53, and optionally other components not shown in FIG. 6. Computing system 50 may be a surface computer, tablet computer, mobile communications device, personal data assistant, desktop computer with a touch screen, laptop computer with a touch screen, or virtually any other computing device that utilizes a touch display.

Logic subsystem 51 may include one or more physical devices configured to execute one or more instructions. For example, the logic subsystem may be configured to execute one or more instructions that are part of one or more programs, routines, objects, components, data structures, or other logical constructs. Such instructions may be implemented to perform a task, implement a data type, transform the state of one or more devices, or otherwise arrive at a desired result. The logic subsystem may include one or more processors that are configured to execute software instructions. Additionally or alternatively, the logic subsystem may include one or more hardware or firmware logic machines configured to execute hardware or firmware instructions. The logic subsystem may optionally include individual components that are distributed throughout two or more devices, which may be remotely located in some embodiments.

Data-holding subsystem 52 may include one or more physical devices configured to hold data and/or instructions executable by the logic subsystem to implement the herein described methods and processes. When such methods and processes are implemented, the state of data-holding subsystem 52 may be transformed (e.g., to hold different data). Data-holding subsystem 52 may include removable media and/or built-in devices. Data-holding subsystem 52 may include optical memory devices, semiconductor memory devices, and/or magnetic memory devices, among others. Data-holding subsystem 52 may include devices with one or more of the following characteristics: volatile, nonvolatile, dynamic, static, read/write, read-only, random access, sequential access, location addressable, file addressable, and content addressable. In some embodiments, logic subsystem 51 and data-holding subsystem 52 may be integrated into one or more common devices, such as an application specific integrated circuit or a system on a chip.

FIG. 6 also shows an aspect of the data-holding subsystem in the form of computer-readable removable media 54, which may be used to store and/or transfer data and/or instructions executable to implement the herein described methods and processes.

Touch display 53 may be used to present a visual representation of data held by data-holding subsystem 52. As the herein described methods and processes change the data held by the data-holding subsystem, and thus transform the state of the data-holding subsystem, the state of touch display 53 may likewise be transformed to visually represent changes in the underlying data. Touch display 53 may be combined with logic subsystem 51 and/or data-holding subsystem 52 in a shared enclosure, or touch display 53 may be a peripheral display device.

Figure 7:
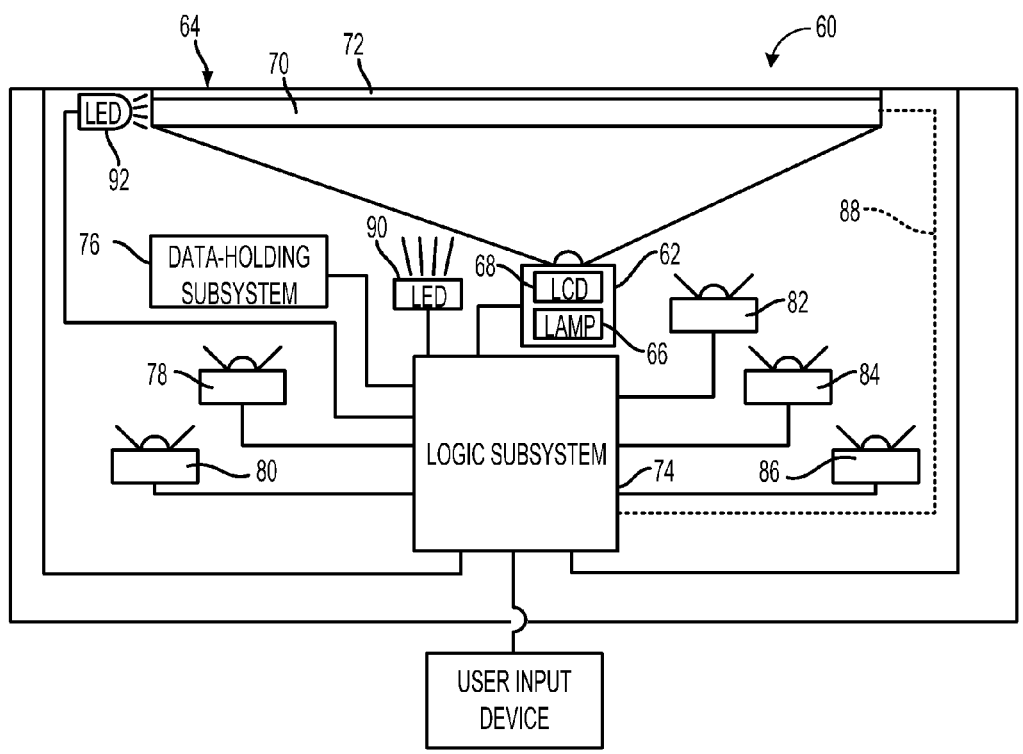
FIG. 7 shows a nonlimiting surface computing device configured to implement a scroll control in accordance with the present disclosure.

FIG. 7 shows a non-limiting example of a surface computing system 60 capable of executing the methods described herein. Surface computing system 60 includes a projection display system having a rear projector 62 that can project images onto display surface 64. Rear projector 62 can include a light source 66, such as the depicted lamp, an LED array, or other suitable light source. Rear projector 62 may also include an image-producing element 68, such as the depicted LCD (liquid crystal display), an LCOS (liquid crystal on silicon) display, a DLP (digital light processing) display, or any other suitable image-producing element. Display surface 64 may include a clear, transparent portion 70, such as a sheet of glass, and a diffuser screen layer 72 disposed on top of the clear, transparent portion 70. In some embodiments, an additional transparent layer (not shown) may be disposed over diffuser screen layer 72 to provide a smooth look and feel to the display surface. In this way, transparent portion 70 and diffuser screen layer 72 can form a non-limiting example of a touch-sensitive region of display surface 64.

Continuing with FIG. 7, surface computing system 60 may further include a logic subsystem 74 and data-holding subsystem 76 operatively coupled to the logic subsystem 74, as described above with reference to logic subsystem 51 and data-holding subsystem 52 of FIG. 6.

To sense objects that are contacting or near to display surface 64, surface computing system 60 may include one or more image capture devices (e.g., sensor 78, sensor 80, sensor 82, sensor 84, and sensor 86) configured to capture an image of the backside of display surface 64, and to provide the image to logic subsystem 74. The diffuser screen layer 72 can serve to reduce or avoid the imaging of objects that are not in contact with or positioned within a few millimeters or other suitable distance of display surface 64, and therefore helps to ensure that at least objects that are touching transparent portion 70 of display surface 64 are detected by the image capture devices.

These image capture devices may include any suitable image sensing mechanism. Examples of suitable image sensing mechanisms include but are not limited to CCD and CMOS image sensors. Further, the image sensing mechanisms may capture images of display surface 64 at a sufficient frequency to detect motion of an object across display surface 64. Display surface 64 may alternatively or further include an optional capacitive, resistive or other electromagnetic touch-sensing mechanism, which may communicate touch input to the logic subsystem via a wired or wireless connection 88.

The image capture devices may be configured to detect reflected or emitted energy of any suitable wavelength, including but not limited to infrared and visible wavelengths. To assist in detecting objects placed on display surface 64, the image capture devices may further include an additional light source, such as one or more light emitting diodes (LEDs). FIG. 7 shows an infrared light source 90 and an infrared light source 92 configured to produce infrared light. Light from such light sources may be reflected by objects contacting or near display surface 64 and then detected by the image capture devices. The use of infrared LEDs as opposed to visible LEDs may help to avoid washing out the appearance of projected images on display surface 64.

In some examples, one or more of infrared light source 90 and/or infrared light source 92 may be positioned at any suitable location within surface computing system 60. In the example of FIG. 7, an infrared light source 92 may be placed along a side of display surface 64. In this location, light from the infrared light source can travel through display surface 64 via internal reflection, while some light can escape from display surface 64 for reflection by an object on the display surface 64. In other examples, an infrared light source 90 may be placed beneath display surface 64 so as to pass emitted light through display surface 64.

It is to be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated may be performed in the sequence illustrated, in other sequences, in parallel, or in some cases omitted. Likewise, the order of the above-described processes may be changed.

The subject matter of the present disclosure includes all novel and nonobvious combinations and subcombinations of the various processes, systems and configurations, and other features, functions, acts, and/or properties disclosed herein, as well as any and all equivalents thereof.

The invention claimed is:

1. A method of interpreting user input, the method comprising:
    scrolling a selectable item on a touch display;
    recognizing a touch input directed to the selectable item while the selectable item is scrolling on the touch display;
    determining if the selectable item is scrolling above a threshold velocity when the touch input directed to the selectable item is recognized, the threshold velocity being selected for the selectable item from a plurality of different threshold velocities based on a size of the selectable item to which the touch input is directed, each of the plurality of different threshold velocities corresponding to one or more different selectable items having a different size; and
    stopping scrolling of the selectable item if the selectable item is determined to be scrolling above the threshold velocity or selecting the selectable item if the selectable item is determined to be scrolling below the threshold velocity.

2. The method of claim 1, further comprising displaying an alternative view of the selectable item upon selection of the selectable item.

3. The method of claim 1, where scrolling the selectable item on the touch display includes scrolling a list including a plurality of selectable items.

4. The method of claim 1, further comprising recognizing a swiping touch input and, responsive to the swiping touch input, scrolling the selectable item with a scrolling inertia on the touch display.

5. The method of claim 1, where the threshold velocity corresponds to the selectable item moving a distance equal to a dimension of the selectable item in a direction of scrolling in one second.

6. The method of claim 1, where the threshold velocity corresponds to the selectable item moving a distance equal to twice a dimension of the selectable item in a direction of scrolling in one second.

7. The method of claim 1, where the threshold velocity corresponds to the selectable item moving a distance equal to one half a dimension of the selectable item in a direction of scrolling in one second.

8. The method of claim 1, where the threshold velocity corresponds to the selectable item moving a distance equal to one quarter a dimension of the selectable item in a direction of scrolling in one second.

9. A computing device, comprising:
a touch display;
a logic subsystem operatively coupled to the touch display; and
a data-holding subsystem holding instructions executable by the logic subsystem to:
scroll a plurality of selectable items on the touch display;
recognize a touch input directed to one of the plurality of selectable items while that selectable item is scrolling on the touch display;
obtain a dimension of that selectable item in a direction of scrolling, the dimension including a pixel size of the selectable item in the direction of scrolling;
apply a multiplier to the obtained dimension for that selectable item to find a threshold velocity specific to that selectable item;
stop scrolling the plurality of selectable items if that selectable item is scrolling above the threshold velocity when the touch input directed to that selectable item is recognized; and
select that selectable item if that selectable item is scrolling below the threshold velocity when the touch input directed to that selectable item is recognized.

10. The computing device of claim 9, where the data-holding subsystem further holds instructions executable by the logic subsystem to display an alternative view of that selectable item upon selection of that selectable item.

11. The computing device of claim 9, where the data-holding subsystem further holds instructions executable by the logic subsystem to scroll a list including the plurality of selectable items.

12. The computing device of claim 9, where the data-holding subsystem further holds instructions executable by the logic subsystem to recognize a swiping touch input and, responsive to the swiping touch input, scroll that selectable item with a scrolling inertia.

13. The computing device of claim 9, where the threshold velocity corresponds to that selectable item moving a distance equal to a dimension of that selectable item in a direction of scrolling in one second.

14. The computing device of claim 9, where the threshold velocity corresponds to that selectable item moving a distance equal to twice a dimension of that selectable item in a direction of scrolling in one second.

15. The computing device of claim 9, where the threshold velocity corresponds to that selectable item moving a distance equal to one half a dimension of the selectable item in a direction of scrolling in one second.

16. The computing device of claim 9, where the threshold velocity corresponds to the selectable item moving a distance equal to one quarter a dimension of that selectable item in a direction of scrolling in one second.

17. The computing device of claim 9, where the touch display includes a projection subsystem and a camera subsystem.

18. The computing device of claim 9, where the touch display includes a capacitive touch screen.

19. A method of interpreting user input, the method comprising:
scrolling a large selectable item and a small selectable item on a touch display, the large selectable item having a larger size than the small selectable item;
recognizing a first touch input directed to the large selectable item while the large selectable item is scrolling on the touch display;
stopping scrolling of the large selectable item if the large selectable item is determined to be scrolling above a first threshold velocity that is based on the larger size or selecting the large selectable item if the large selectable item is scrolling below the first threshold velocity;
recognizing a second touch input directed to the small selectable item while the small selectable item is scrolling on the touch display;
stopping scrolling of the small selectable item if the small selectable item is determined to be scrolling above a second threshold velocity that is based on a size of the small selectable item or selecting the small selectable item if the small selectable item is scrolling below the second threshold velocity.

20. The method of claim 19, wherein the first threshold velocity is greater than the second threshold velocity.

* * * * *